United States Patent [19]
Pelegris

[11] Patent Number: 5,359,657
[45] Date of Patent: Oct. 25, 1994

[54] TELEPHONE LINE OVERVOLTAGE PROTECTION APPARATUS

[75] Inventor: Dimitris J. Pelegris, Mount Prospect, Ill.

[73] Assignee: Oneac Corporation, Libertyville, Ill.

[21] Appl. No.: 71,755

[22] Filed: Jun. 9, 1993

Related U.S. Application Data

[63] Continuation-in-part of Ser. No. 895,380, Jun. 8, 1992, abandoned.

[51] Int. Cl.$^5$ .......................... H02H 1/00; H02H 1/04
[52] U.S. Cl. .................................... 379/412; 361/119; 361/124; 337/32
[58] Field of Search ................ 379/412; 361/119, 124; 337/32

[56] References Cited

U.S. PATENT DOCUMENTS

| | | | |
|---|---|---|---|
| 4,613,732 | 9/1986 | Cwirzen et al. | 361/119 |
| 4,876,621 | 10/1989 | Rust et al. | 361/119 |
| 4,903,295 | 2/1990 | Shannon et al. | 379/412 |
| 4,905,119 | 2/1990 | Webb | 361/119 |
| 4,924,345 | 5/1990 | Siemon et al. | 361/119 |
| 4,941,063 | 7/1990 | McCartney et al. | 361/119 |
| 4,964,160 | 10/1990 | Traube et al. | 379/412 |
| 5,031,067 | 7/1991 | Kidd et al. | 361/119 |
| 5,150,271 | 9/1992 | Unterweger et al. | 361/119 |
| 5,157,580 | 10/1992 | Hegner et al. | 361/119 |
| 5,175,662 | 12/1992 | DeBalko et al. | 361/119 |
| 5,191,605 | 3/1993 | Brower | 379/412 |

Primary Examiner—James L. Dwyer
Assistant Examiner—Scott L. Weaver
Attorney, Agent, or Firm—Mason, Kolehmainen, Rathburn & Wyss

[57] ABSTRACT

An overvoltage protection apparatus used with a pair of telephone lines includes first voltage clamping circuitry for clamping voltage signals on the lines at a first predetermined voltage potential. The first voltage clamping circuitry is formed by at least a pair of solid-state protective chip devices and a failure mode mechanism adapted for connecting the lines to ground responsive to increased temperature of the solid-state protective chip device and providing a ground connection for the pair of solid-state protective chip devices. A pair of current limiting resistors operatively connected to the failure mode mechanism provide sneak current protection.

12 Claims, 6 Drawing Sheets

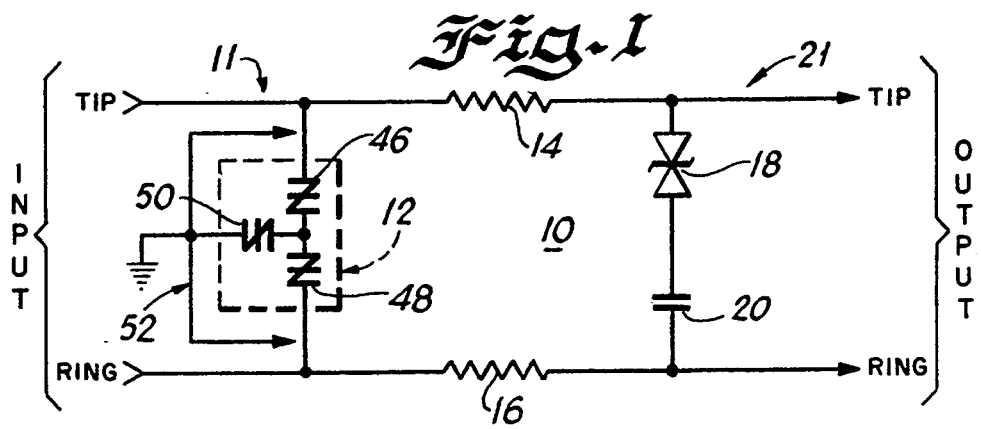
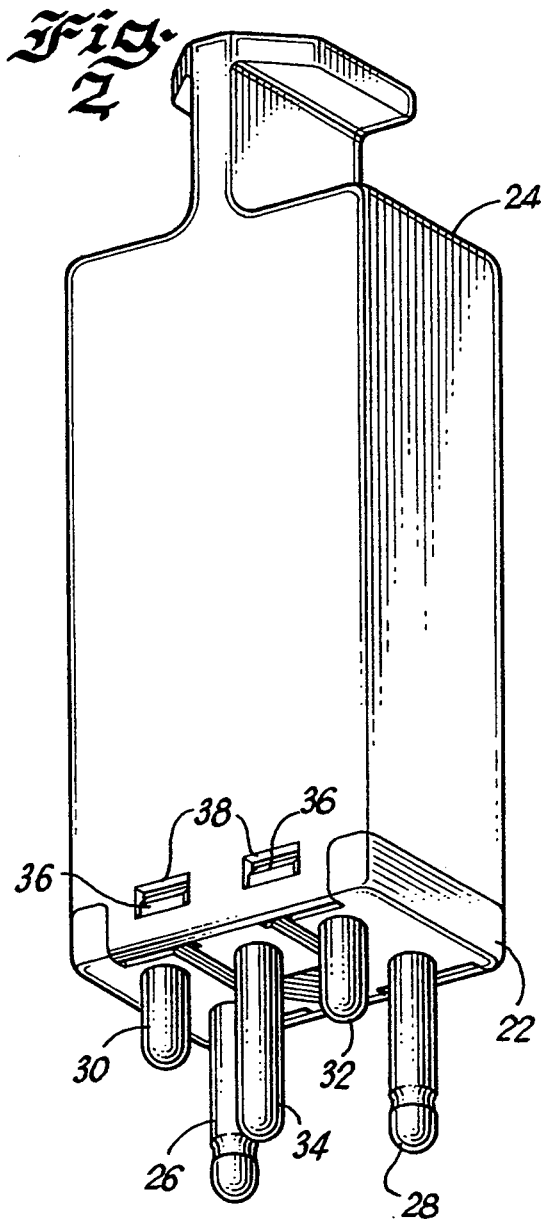
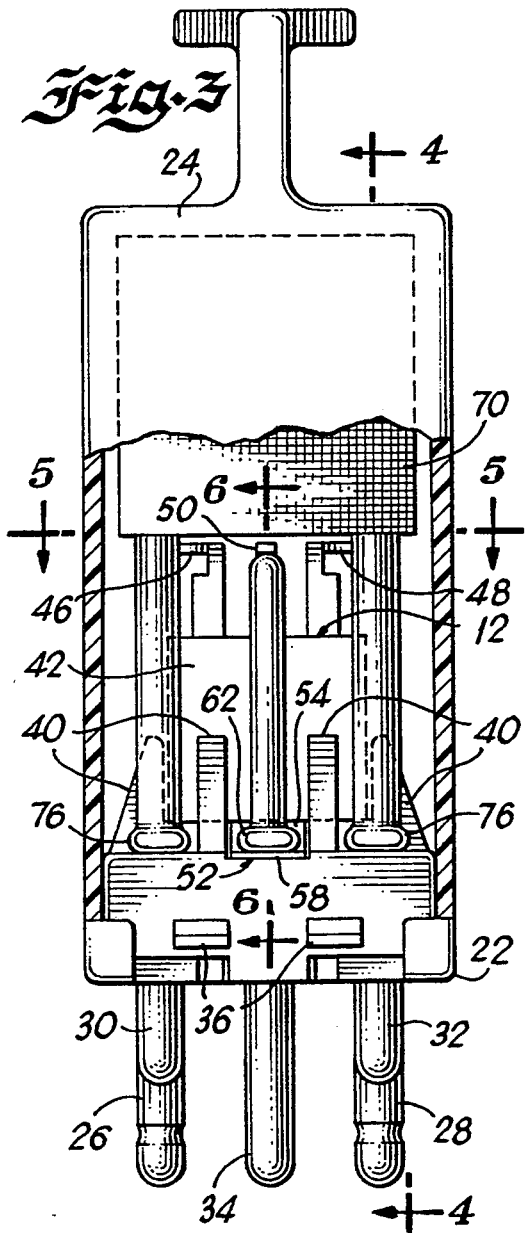

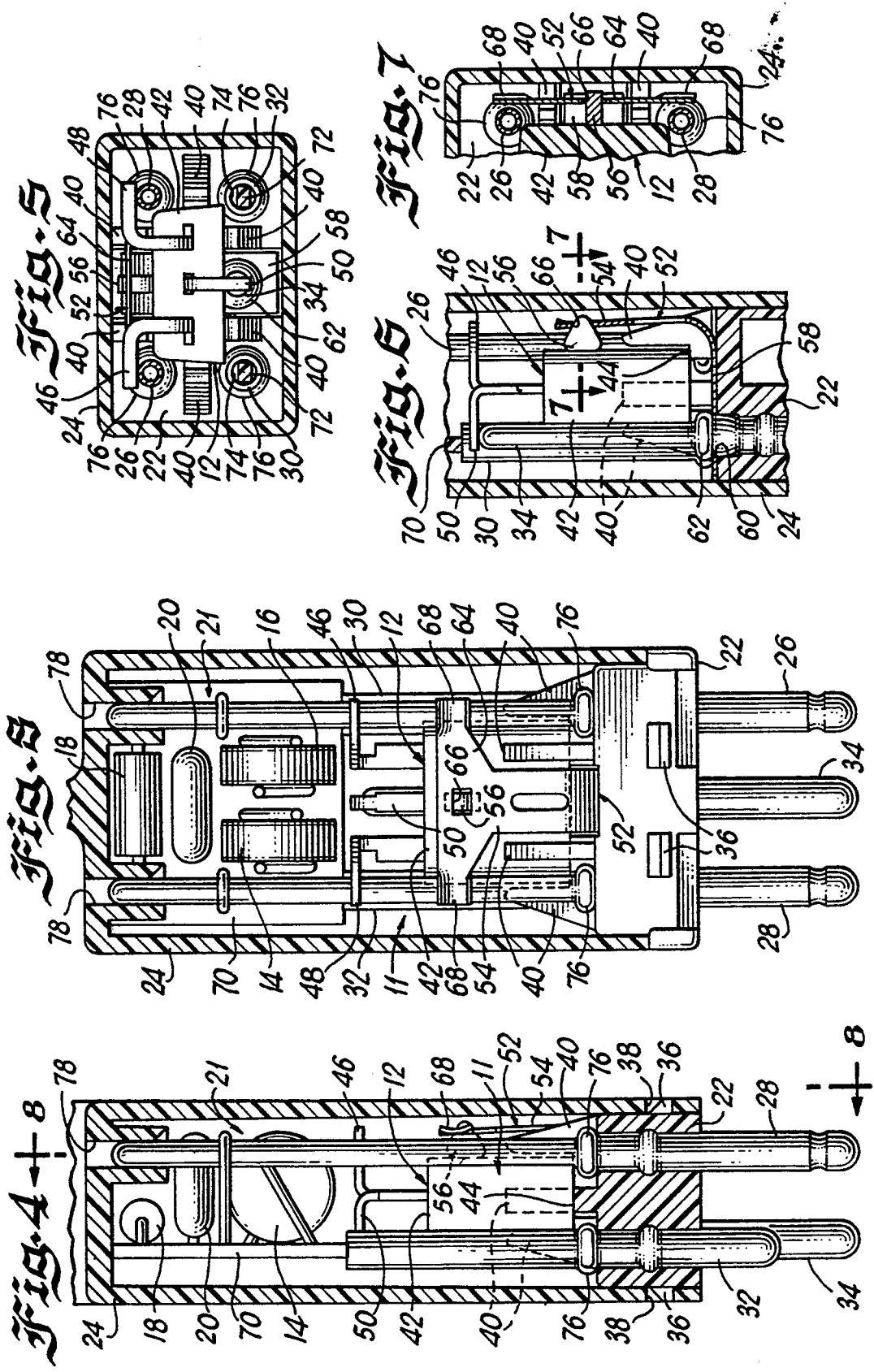

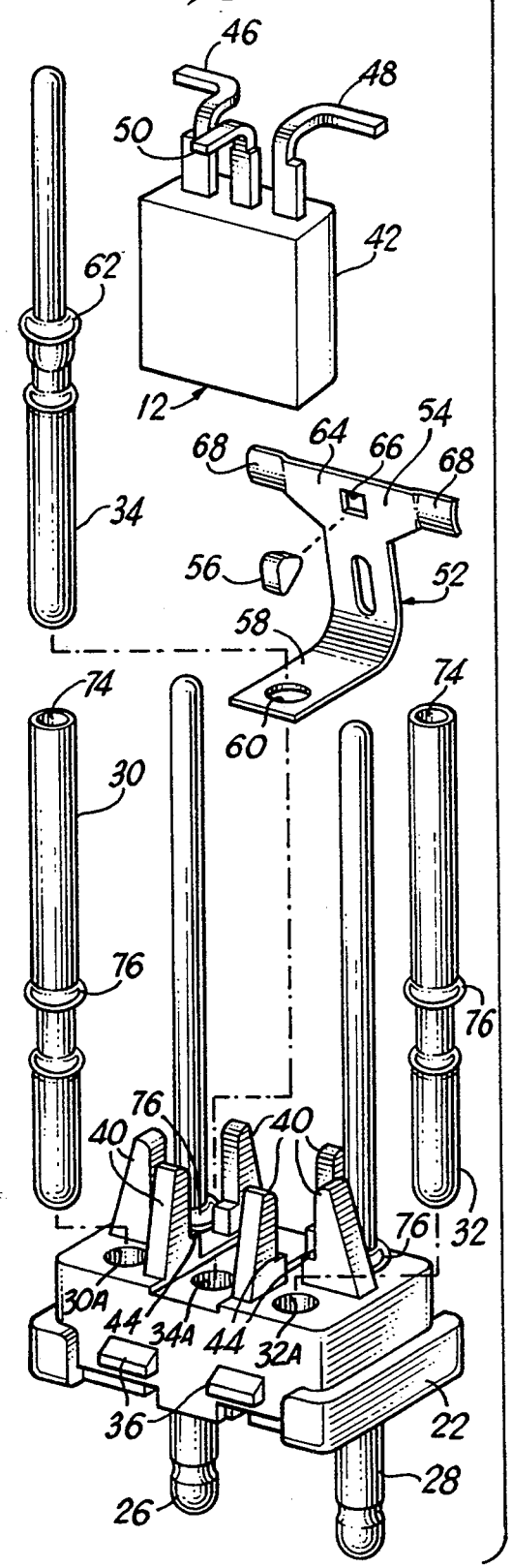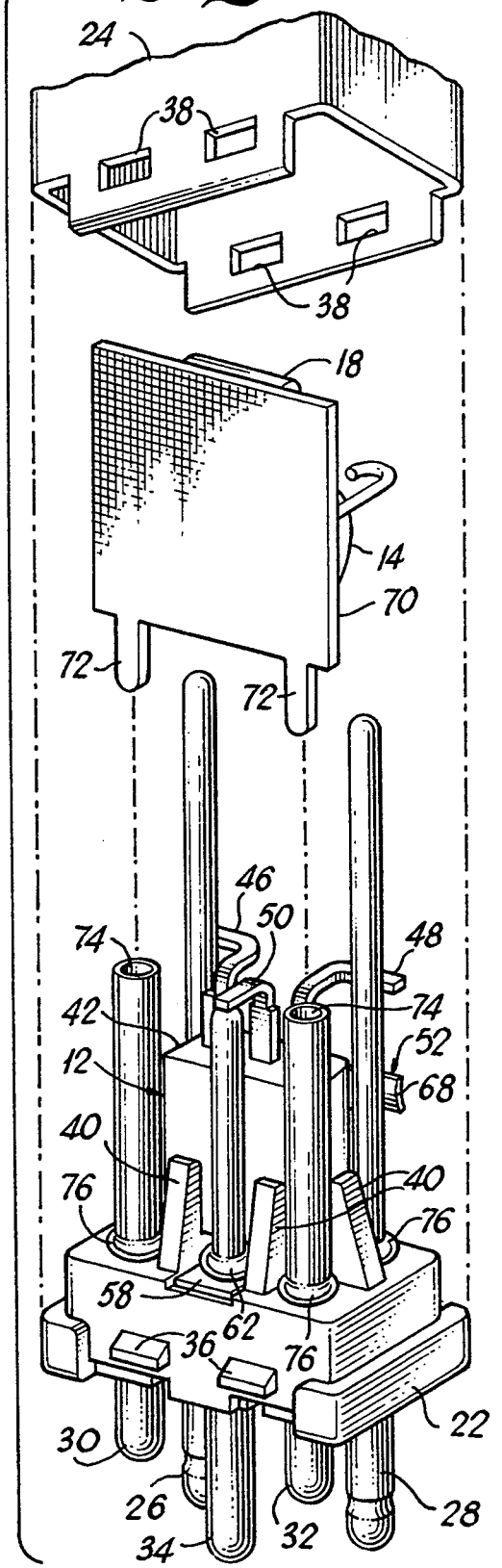

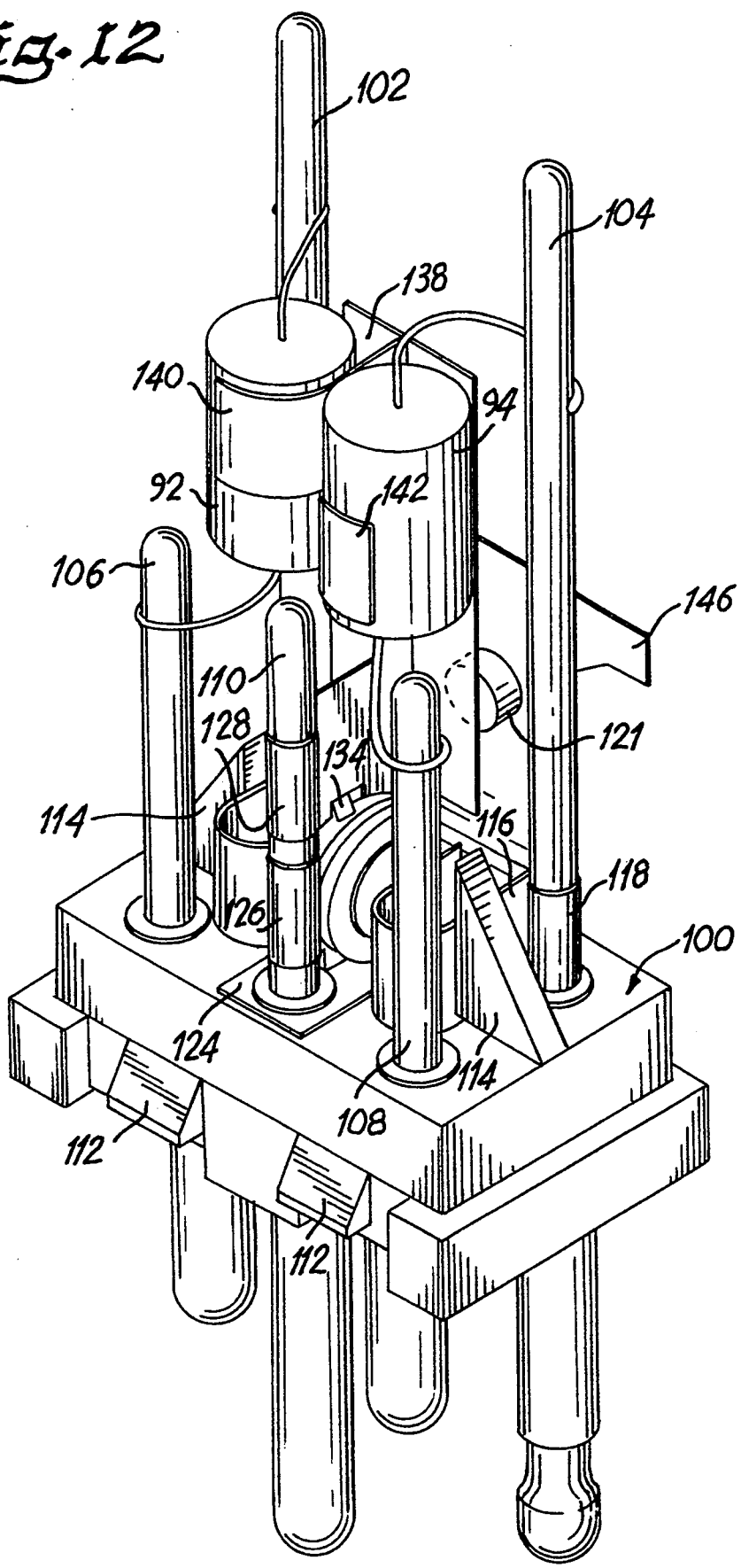

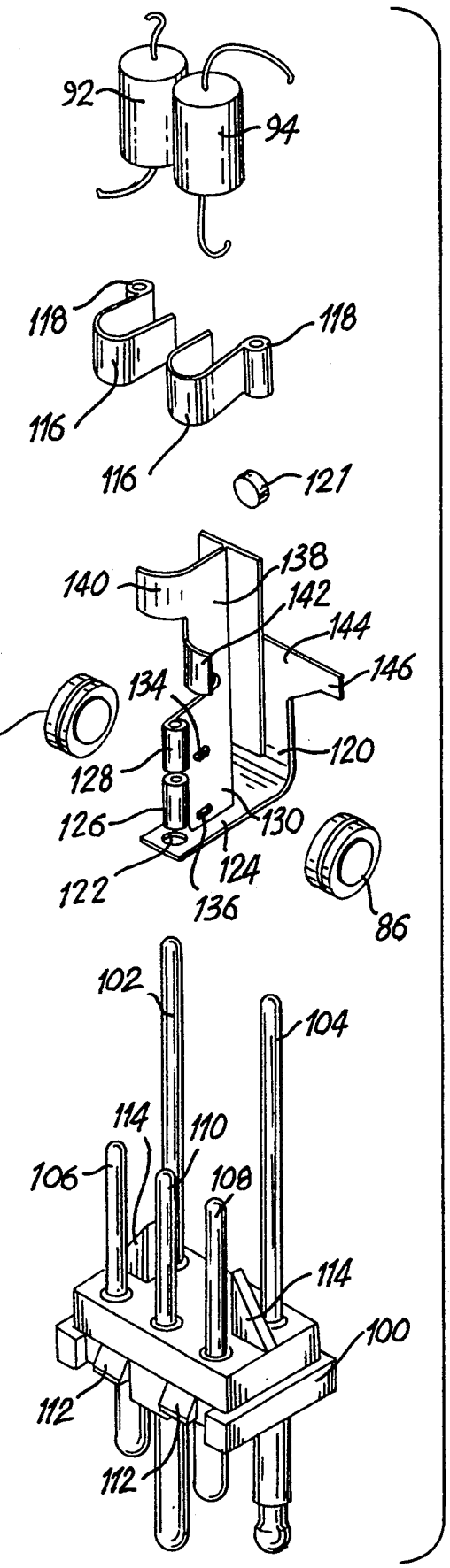

TELEPHONE LINE OVERVOLTAGE PROTECTION APPARATUS

CROSS REFERENCE TO RELATED APPLICATION

This is a continuation-in-part of copending U.S. patent application Ser. No. 07/895,380, filed Jun. 8, 1992, now abandoned by the present inventor and the same assignee as the present application.

BACKGROUND OF THE INVENTION

1. Field of the Invention

The present invention relates generally to telephone line overvoltage protection devices, and more particularly to an improved telephone line overvoltage protection method and apparatus.

2. Description of the Prior Art

Overvoltage protection devices are commonly used with telephone lines for protecting telephone equipment against hazardous voltages due to lightning or power surges. Overvoltage protection circuitry that overcomes many disadvantages of the prior art circuitry is disclosed in McCartney, U.S. Pat. No. 4,758,920, issued Jul. 19, 1988; and McCartney et al., U.S. Pat. No. 4,941,063, issued Jul. 10, 1990; and both are assigned to the assignee of the present invention.

An inert, gas-filled, protective device or gas discharge tube with electrodes inserted between TIP and RING INPUT connections often is used for protection from hazardous voltages, for example, due to lightning and power surges. A significant disadvantage of the inert, gas-filled, protective device or gas discharge tube is the relatively long response time delay as compared to a solid-state device. However, known protective arrangements that utilize a solid-state device do not provide balanced operation in a failure mode to shunt both the TIP and RING to ground. A need exists for a first protective device having a short response time delay and providing effective failure mode balanced operation.

Other problems with known protection devices generally effective for overvoltage noise and transient protection include the complexity, the difficulty and time required for manufacture and assembly.

SUMMARY OF THE INVENTION

Among the principal objects of the present invention are to provide an improved telephone line overvoltage protection device; to provide a telephone line overvoltage protection device facilitating improved reliability; and to provide a telephone line overvoltage protection device overcoming many of the disadvantages of known overvoltage protection devices.

In brief, the objects and advantages of the present invention are achieved by a telephone line overvoltage protection apparatus and a method of forming a telephone line overvoltage protection apparatus. An overvoltage protection apparatus used with a pair of telephone lines includes first voltage clamping circuitry for clamping voltage signals on the lines at a first predetermined voltage potential. The first voltage clamping circuitry is formed by at least a pair of solid-state protective chip devices and a failure mode mechanism adapted for connecting the lines to the ground responsive to increased temperature of the solid-state protective chip devices and providing a ground connection for the pair of solid-state protective devices.

BRIEF DESCRIPTION OF THE DRAWING

The present invention together with the above and other objects and advantages may best be understood from the following detailed description of the embodiment of the invention illustrated in the drawing, wherein:

FIG. 1 is a schematic diagram representation of a telephone line overvoltage protection device constructed in accordance with the present invention;

FIG. 2 is a perspective view of the telephone line overvoltage protection device of FIG. 1;

FIG. 3 is an elevational view partly broken away of a telephone line overvoltage protection device of FIG. 1;

FIG. 4 is a sectional view of the telephone line overvoltage protection device viewed from the line 4—4 of FIG. 3;

FIG. 5 is a sectional view of the telephone line overvoltage protection device viewed from the line 5—5 of FIG. 3;

FIG. 6 is a sectional view of the telephone line overvoltage protection device viewed from the line 6—6 of FIG. 3;

FIG. 7 is a sectional view of the telephone line overvoltage protection device viewed from the line 7—7 of FIG. 6;

FIG. 8 is a sectional view of the telephone line overvoltage protection device viewed from the line 8—8 of FIG. 4;

FIG. 9 is a exploded perspective view of a portion of the telephone overvoltage protection device of FIG. 1 constructed in accordance with the present invention;

FIG. 10 is a similar view to FIG. 9 illustrating a base unit after being assembled with first overvoltage protection circuitry aligned for engagement with a printed wiring board carrying second overvoltage protection circuitry;

FIG. 12 is an enlarged perspective view of a first alternate arrangement of the telephone line overvoltage protection device of FIG. 11;

FIG. 13 is an exploded perspective view of a second alternate arrangement of the telephone line overvoltage protection device of FIGS. 11 and 12.

DETAILED DESCRIPTION OF THE PREFERRED EMBODIMENT

Figure 11:
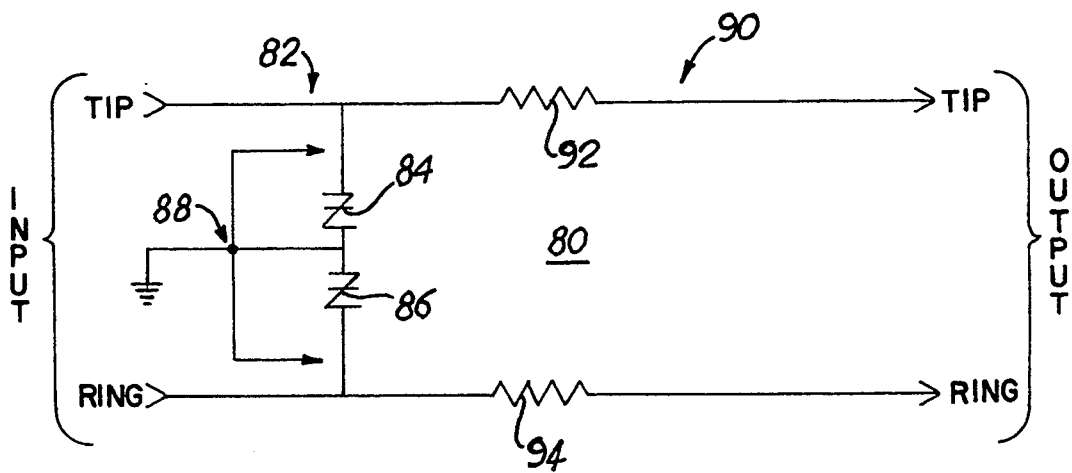
FIG. 11 is a schematic diagram representation of a first alternative telephone line overvoltage protection device constructed in accordance with the present invention.

Referring now to the drawings, in FIGS. 1–10 there is illustrated a telephone line overvoltage protection device designated as a whole by the reference character 10 and constructed in accordance with principles of the present invention. Having reference to FIG. 1, the telephone line overvoltage protection device 10 includes first overvoltage protection circuitry generally designated 11 including a first solid-state overvoltage protector device generally designated 12 connected between the TIP and RING INPUT connections. Second overvoltage protection circuitry generally designated 21 includes a resistor 14 connected in series with the TIP line, a resistor 16 connected in series with the RING line, a transient voltage suppressor 18 and a capacitor 20 connected between the resistors 14 and 16 series connected with the TIP and RING OUTPUT connections.

The solid-state overvoltage device 12 is a bidirectional transient surge protector with a selected voltage clamping voltage for protecting from lightning, line transients and other high voltage spikes. Various commercially available devices can be used for the solid-state overvoltage device 12, for example, such as, a balanced, triple sidactor part number P343TAB having a minimum breakover voltage rating of 300 volts and manufactured by Teccor Electronics, Inc. of Irving, Texas. Preferably the current limiting resistors 14 and 16 are positive temperature coefficient (PTC) resistors having a higher resistance value with higher current to provide a resettable fuse functional operation. Alternatively, resistors 14 and 16 are fusible resistors that open-circuit for current limiting at a predetermined temperature or corresponding current value.

Referring to FIGS. 2–10, a base unit 22 and a cover 24 together form a housing for the overvoltage protection device 10. Base unit 22 receives and positions TIP and RING INPUT pins 26, 28, TIP and RING OUTPUT pins 30, 32 and a ground pin 34 within corresponding apertures 26A, 28A, 30A, 32A and 34A arranged in a conventional configuration. Base unit 22 includes a plurality of wedges or fingers 36 received and retained in a corresponding aperture or opening 38 of the cover 24 for snap-fit engagement of the base 22 with the cover 24. Base unit 22 includes a plurality of upstanding arms 40 defining a cavity for slidingly receiving a main body portion 42 of the overvoltage protective device 12 until a recessed stop surface or ledge 44 is engaged. Overvoltage protective device 12 includes opposed electrodes 46 and 48 for electrical connection with TIP and RING INPUT pins 26, 28 and a centrally located electrode 50 for electrical connection with the ground pin 34.

As best shown in FIG. 9, apparatus generally designated 52 for balanced operation in a failure mode includes a fail safe device 54 and a fusible pellet 56. Fail safe device 54 includes a horizontally extending lower portion 58 having an aperture 60 for slidingly receiving the ground pin 34. An enlarged collar portion 62 of the ground pin engages the lower portion 58 providing an electrical ground connection to the fail safe device 54. A vertically extending upper portion 64 of the fail safe device 54 includes an aperture 66 for locating and retaining the fusible pellet 56 adjacent a hot spot at a predetermined area of the solid-state overvoltage device 12. A pair of opposed ends 68 of upper portion 64 are located adjacent to the TIP and RING INPUT pins 26, 28. In the event of overheating of the solid-state overvoltage device 12, the fusible pellet 56 establishes a short circuit between the fail safe device 54 and the TIP and RING INPUT pins 26, 28.

A printed wiring board 70 carrying the second overvoltage protection circuitry 21 has a pair of downwardly depending tabs 72 received within openings 74 of the TIP and RING OUTPUT pins 30, 32 for electrical connection with the OUTPUT pins.

Assembly of the overvoltage protection device 10 is best understood with reference to FIGS. 9 and 10. Referring to FIG. 9, the pins 26, 28, 30, 32 and 34 are slidingly received within corresponding apertures 26A, 28A, 30A, 32A and 34A of the base 22. The ground pin 34 is received within the aperture 60 of the fail safe device 54 until the stop collar portion 62 is engaged. TIP and RING INPUT and OUTPUT pins 26, 28, 30 and 32 similarly include an enlarged stop collar portion 76 for locating the TIP and RING INPUT and OUTPUT pins within the base 22. The solid-state overvoltage device 12, fail safe member 54 and the fusible pellet 56 are received and positioned within the cavity defined by arms 40 of the base unit 22. The printed wiring board 70 carrying the second overvoltage protection circuitry 21 is electrically connected with the OUTPUT pins 30 and 32 via the tabs 72 received within the pin openings 74. The assembled condition of the overvoltage protection device 10 is illustrated in FIGS. 2–8.

Referring to FIGS. 4 and 8, an aperture 78 in the cover 24 can be aligned with each of the TIP and RING INPUT pins 26 and 28, as shown, providing test access within the cover 24. Apertures 78 can be eliminated depending on the environmental conditions for the overvoltage protection device 10.

Preferably, both the base 22 and the cover 24 of the telephone line overvoltage protection device 10 are a unitary member formed of strong, flexible electrically insulating material. A plastic or similar, synthetic resin material forms both the base 22 and the cover 24 of the telephone line overvoltage protection device 10 by conventional injection molding techniques. Fail safe device 54 is formed of an electrically conductive material, for example, such as, a stamped and formed sheet metal material.

Referring now to FIG. 11, there is shown a schematic diagram representation of a first alternative telephone line overvoltage protection device generally designated 80 constructed in accordance with the present invention. Telephone line overvoltage protection device 80 includes first overvoltage protection circuitry generally designated 82. In accordance with a feature of the invention, first overvoltage protection circuitry includes a pair of solid-state overvoltage protector integrated circuit devices or chips 84 and 86 connected between the TIP and RING INPUT connections. First overvoltage protection circuitry 82 includes a failure mode apparatus generally designated 88. Second overvoltage protection circuitry 90 includes a resistor 92 connected in series with the TIP line and a resistor 94 connected in series with the RING line.

Various commercially available devices can be used for the solid-state overvoltage chips 84 and 86, for example, such as, a part number P194 having a minimum breakover voltage rating of 300 volts and manufactured by Teccor Electronics, Inc. of Irving, Texas.

Referring also to FIGS. 12 and 13, the first alternate arrangement of the telephone line overvoltage protection device 80 is shown. A base unit 100 includes similar features as base unit 22 for use with the cover 24 as shown in FIGS. 2–10. Base unit 100 receives and positions TIP and RING INPUT pins 102, 104; TIP and RING OUTPUT pins 106, 108; and a ground pin 110 within corresponding apertures arranged in a conventional configuration. Base unit 100 includes a plurality of wedges or fingers 112 received and retained in the corresponding aperture or opening 38 of the cover 24 for snap-fit engagement of the base unit 100 with the cover 24. Base unit 100 includes a pair of opposed upstanding ledges 114. Each of a pair of electrically conductive, generally U-shaped members or straps 116 engages one side of the respective overvoltage protective chips 84 and 86 positioned relative to ledges 114. Each strap 116 includes a formed-end portion 118 for receiving and providing electrical connection to a corresponding one of the TIP and RING INPUT pins 102, 104.

A unitary member 120 provides both an electrical ground function and a fail safe operation together with a fusible pellet 121. Unitary member 120 preferably is stamped and formed of an electrically conductive material, such as a sheet metal material. Unitary member 120 includes an aperture 122 formed in a lower portion 124 supported by the base unit 100 for slidingly receiving the ground pin 110. A pair of formed portions 126 and 128 are formed in an upstanding central portion 130 of unitary member 120 and are aligned with aperture 122 for slidingly receiving the ground pin 110. Central portion 130 engages and provides an electrical ground connection to the overvoltage protective chips 84 and 86. An upper tab 134 and a lower tab 136 are punched or formed in the central portion 130 for receiving and positioning the overvoltage protective chips 92 and 94. An upper central portion 138 of unitary member 120 includes a pair of arms 140 and 142 for receiving and mechanically positioning the resistors 92 and 94. An upstanding end portion 144 of unitary member 120 includes a pair of opposed arms 146 located adjacent TIP and RING INPUT pins 102, 104. Fail safe apparatus 88 provides an equivalent function as fail safe apparatus 52 of FIGS. 1–10. If overheating of a solid-state overvoltage chip 84 or 86 or chips 84 and 86 occurs, the fusible pellet 121 establishes a short circuit between the arms 146 and the TIP and RING INPUT pins 102,104. Overvoltage chips 84 and 86 and the failure mode apparatus 88 provide balanced operation in the overvoltage failure mode to shunt both the TIP and RING to ground.

When the current limiting resistors 92 and 94 are subjected to over current or sneak current, heating of the resistors 92 and 94 causes the fusible pellet 121 to melt. The fusible pellet 121 establishes a short circuit between the arms 146 and the TIP and RING INPUT pins 102, 104. Current limiting resistors 92 and 94 and the failure mode apparatus 88 provide balanced operation in the sneak current failure mode to shunt both the TIP and RING to ground.

In protection circuit 80, the current limiting resistors 92 and 94 can be omitted. Then the TIP and RING INPUT and OUTPUT terminal pins are connected together. Also, second protection circuitry as shown in FIG. 1 including a transient voltage suppressor 18 and a capacitor 20 can be provided with the protection circuit 80.

Figure 14:
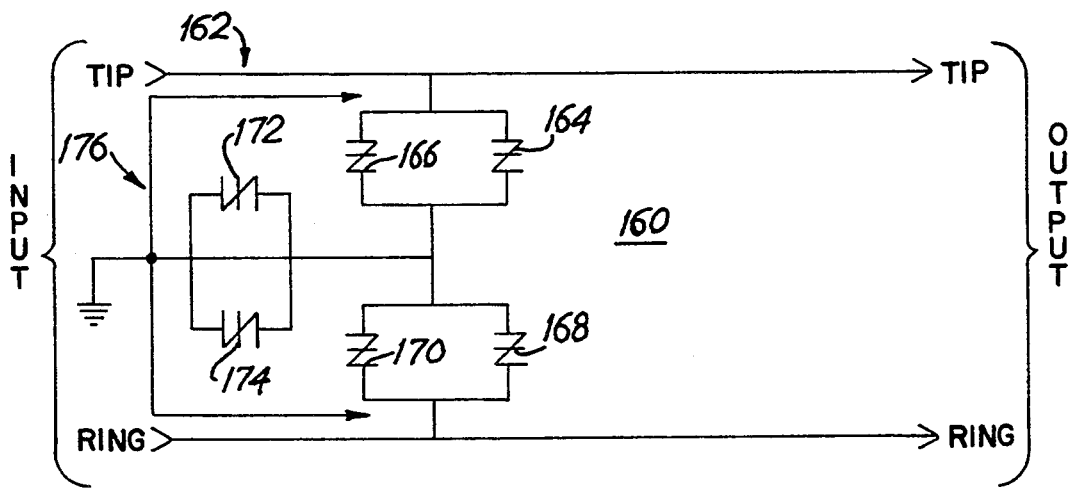
FIG. 14 is a schematic diagram representation of a second alternative telephone line overvoltage protection device constructed in accordance with the present invention.

FIG. 14 provides a schematic diagram representation of a second alternative telephone line overvoltage protection device generally designated 160 including first overvoltage protection circuitry generally designated 162. Advantages of using single chip devices 84 and 86 as shown in FIG. 11 and similar single chip devices as shown in FIG. 14 are the simplicity and the ease of reconfiguring the protection circuitry and manufacture and assembly.

First overvoltage protection circuitry 162 includes a first pair of parallel connected, solid-state overvoltage protector integrated circuit devices or chips 164 and 166 connected in series with a second pair of parallel connected, solid-state overvoltage protector integrated circuit devices or chips 168 and 170. The first and second pair of parallel connected chips 164 and 166 and 168 and 170 are connected between the TIP and RING INPUT connections. A third pair of parallel connected, solid-state overvoltage protector chips 172 and 174 are connected between the junction of the first and second pair of parallel connected chips 164 and 166 and 168 and 170 and a ground connection. First overvoltage protection circuitry 162 similarly includes a failure mode apparatus generally designated 176. The parallel arrangement of the solid-state overvoltage chips of the first overvoltage protection circuitry 162 provides increased current carrying capability for the overvoltage failure mode.

While the invention has been described with reference to details of the illustrated embodiment, these details are not intended to limit the scope of the invention as defined in the appended claims.

What is claimed is:

1. An overvoltage protection apparatus used with a pair of telephone lines comprising:
   first voltage clamping means for clamping voltage signals on said lines at a first predetermined voltage potential;
   said first voltage clamping means formed by at least a pair of solid-state protective chip devices and a failure mode mechanism adapted for connecting said lines to ground responsive to increased temperature of said solid-state protective chip devices, said failure mode mechanism providing a ground connection for the pair of solid-state protective chip devices;
   a first base housing defining a plurality of terminal-pin receiving channels; a pair of INPUT TIP and RING terminal-pins; a pair of OUTPUT TIP and RING terminal-pins; and a ground terminal-pin, each of said terminal-pins received within a corresponding one of said terminal-pin receiving channels;
   each of said pair of INPUT TIP and RING terminal-pins, said pair of OUTPUT TIP and RING terminal-pins, and said ground terminal-pin having an enlarged stop collar portion locating each of said terminal-pins within said first base housing and each of said-terminal-pins having elongated pin portions extending both above and below said first base housing;
   said failure mode mechanism comprising an electrically conductive stamped and formed member and a fusible element;
   said failure mode electrically conductive stamped and formed member being a unitary member having a base portion supported by said first base housing and defining an aperture receiving said ground terminal-pin in electrical contact engagement;
   said failure mode electrically conductive stamped and formed member including a first upstanding portion engaging and providing electrical ground connection to each of said pair of solid-state protective chip devices; and said first upstanding portion having a pair of formed socket portions aligned with said aperture and receiving said ground terminal-pin; and
   said first upstanding portion having tab means for positioning and retaining each of said pair of solid-state protective chip devices.

2. An overvoltage protection apparatus as recited in claim 1 wherein said failure mode electrically conductive stamped and formed unitary member includes a pair of outwardly extending opposed arms located adjacent said INPUT TIP and RING terminal-pins.

3. An overvoltage protection apparatus as recited in claim 2 wherein said fusible element melts at a predetermined temperature and positions said pair of outwardly extending opposed arms in electrical contact engagement with said INPUT TIP and RING terminal-pins.

4. An overvoltage protection device as recited in claim 1 further includes current limiting means for limiting current flow in said lines; and wherein said electrically conductive stamped and formed member includes a pair of arms for receiving and mechanically positioning said current limiting resistors.

5. An overvoltage protection device as recited in claim 1 further includes current limiting resistors for limiting current flow in said lines; said current limiting resistors operatively coupled to said failure mode mechanism adapted for connecting said lines to ground responsive to increased temperature of said current limiting resistors.

6. An overvoltage protection device as recited in claim 1 wherein said pair of solid-state protective chip devices are connected in series between said INPUT TIP and RING terminal-pins and a junction of said pair of solid-state protective chip devices is connected to said ground terminal-pin.

7. An overvoltage protection device as recited in claim 1 wherein a first and a second pair of parallel connected solid-state protective chip devices are connected in series between said INPUT TIP and RING terminal-pins and a junction of said pairs of parallel connected solid-state protective chip devices is connected to said ground terminal-pin.

8. An overvoltage protection device as recited in claim 1 wherein a first and a second pair of parallel connected solid-state protective chip devices are connected in series between said INPUT TIP and RING terminal-pins.

9. An overvoltage protection device as recited in claim 7 wherein the junction of said pairs of parallel connected solid-state protective chip devices is connected to a third pair of parallel connected solid-state protective chip devices connected to said ground terminal-pin.

10. An overvoltage protection device as recited in claim 1 wherein said first base housing is formed by injection molding of a synthetic resin material.

11. An overvoltage protection device used with a pair of telephone lines comprising:
a first base housing defining a plurality of terminal-pin receiving channels;
a pair of INPUT TIP and RING terminal-pins; a pair of OUTPUT TIP and RING terminal-pins; and a ground terminal-pin, each of said terminal-pins received within a corresponding one of said terminal-pin receiving channels;
first voltage clamping means connected between said INPUT TIP and RING terminal-pins and said ground terminal-pin for clamping voltage signals on said lines at a first predetermined voltage potential;
said first voltage clamping means formed by at least a pair of solid-state protective chip devices connected in series between said INPUT TIP and RING terminal-pins and a failure mode mechanism supported by said first base housing, said failure mode mechanism adapted for connecting said lines to ground with said INPUT terminal-pins responsive to increased temperature of said solid-state protective chip devices and said failure mode mechanism providing a ground connection for the pair of solid-state protective devices;
each of said pair of INPUT TIP and RING terminal-pins, said pair of OUTPUT TIP and RING terminal-pins, and said ground terminal-pin having an enlarged stop collar portion locating each of said terminal-pins within said first base housing and each of said terminal-pins having elongated pin portions extending both above and below said first base housing;
said failure mode mechanism comprising an electrically conductive stamped and formed member and a fusible element;
said failure mode electrically conductive stamped and formed member being a unitary member having a base portion supported by said first base housing and defining an aperture receiving said ground terminal-pin in electrical contact engagement;
said failure mode electrically conductive stamped and formed member including a first upstanding portion engaging and providing electrical ground connection to each of said pair of solid-state protective chip devices; and said first upstanding portion having a pair of formed socket portions aligned with said aperture and receiving said ground terminal-pin; and
said first upstanding portion having tab means for positioning and retaining each of said pair of solid-state protective chip devices.

12. An overvoltage protection device used with a pair of telephone lines comprising:
a first base housing defining a plurality of terminal-pin receiving channels;
a pair of INPUT TIP and RING terminal-pins, a pair of OUTPUT TIP and RING terminal-pins, and a ground terminal-pin, each terminal-pin mounted in a respective terminal-pin receiving channel;
first voltage clamping means connected between INPUT TIP and RING terminal-pins and a ground terminal-pin for clamping voltage signals on said lines at a first predetermined voltage potential;
a pair of current limiting resistors for limiting sneak current on said lines; each resistor connected in series between a respective one of said INPUT TIP and RING terminal-pins and said OUTPUT TIP and RING terminal-pins;
said first voltage clamping means formed by at least a pair of solid-state protective chip devices connected in series between said INPUT TIP and RING terminal-pins and a failure mode mechanism supported by said first base housing, said failure mode mechanism adapted for connecting said lines to ground with said INPUT terminal-pins responsive to increased temperature of either said solid-state protective chip devices or said current limiting resistors and said failure mode mechanism providing a ground connection for the pair of solid-state protective devices;
each of said pair of INPUT TIP and RING terminal-pins, said pair of OUTPUT TIP and RING terminal-pins, and said ground terminal-pin having an enlarged stop collar portion locating each of said terminal-pins within said first base housing and each of said terminal-pins having elongated pin portions extending both above and below said first base housing;
said failure mode mechanism comprising an electrically conductive stamped and formed member and a fusible element:

said failure mode electrically conductive stamped and formed member being a unitary member having a base portion supported by Said first base housing and defining an aperture receiving said ground terminal-pin in electrical contact engagement said failure mode electrically conductive stamped and formed member including a first upstanding portion engaging and providing electrical ground connection to each of said pair of solid-state protective chip devices; and said first upstanding portion having a pair of formed socket portion aligned with said aperture and receiving said ground terminal-pin; and said first upstanding portion having tab means for positioning and retaining each of said pair of solid-state protective chip devices.

* * * * *